(12) United States Patent
Vuong

(10) Patent No.: US 8,863,009 B2
(45) Date of Patent: Oct. 14, 2014

(54) METHOD AND APPARATUS FOR INTEGRATING SOCIAL NETWORKING STAUS UPDATES WITH CONTACT DATA AT A COMMUNICATION DEVICE

(75) Inventor: Thanh Vinh Vuong, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 451 days.

(21) Appl. No.: 12/630,927

(22) Filed: Dec. 4, 2009

(65) Prior Publication Data

US 2011/0138279 A1 Jun. 9, 2011

(51) Int. Cl.
*G06F 3/00* (2006.01)
*G06Q 10/10* (2012.01)

(52) U.S. Cl.
CPC ..................... *G06Q 10/10* (2013.01)
USPC .......................................... 715/752

(58) Field of Classification Search
USPC ............. 715/711, 752; 709/206, 203
See application file for complete search history.

(56) References Cited

U.S. PATENT DOCUMENTS

| | | | |
|---|---|---|---|
| 7,685,519 B1 * | 3/2010 | Duncan et al. ............. | 715/711 |
| 7,996,045 B1 * | 8/2011 | Bauer et al. ............... | 455/566 |
| 2005/0193345 A1 * | 9/2005 | Klassen et al. ............. | 715/751 |
| 2007/0143433 A1 | 6/2007 | Daigle | |
| 2007/0174389 A1 * | 7/2007 | Armstrong et al. .......... | 709/204 |
| 2008/0148154 A1 * | 6/2008 | Burrell et al. .............. | 715/733 |
| 2009/0168977 A1 | 7/2009 | Galvin | |
| 2010/0169364 A1 * | 7/2010 | Hardt ........................ | 707/769 |
| 2010/0180001 A1 * | 7/2010 | Hardt ........................ | 709/207 |
| 2010/0318925 A1 * | 12/2010 | Sethi et al. .................. | 715/760 |
| 2011/0053578 A1 * | 3/2011 | Rochford .................... | 455/418 |

FOREIGN PATENT DOCUMENTS

WO 2007/038027 4/2007

OTHER PUBLICATIONS

"Fring Installation and User Manual" Internet Citation; Jun. 26, 2007, pp. I-II, XP002503658 Retrieved from the Internet: URL:http://web.archive.org/web/20070704225846rn_I/www.fring.com/support/user_guide/fring_user_manual_s8_3.pdf [retrieved on Nov. 11, 2008] pp. 1-19.
European Patent Application No. 09 17 8100.5 Search Report Dated Jun. 21, 2010.
Canadian Patent Application No. 2721305 Examination Report dated Oct. 28, 2013.
New Windows Mobile Address book with social network and presence, downloaded from: http://wmpoweruser.com/? p=3999, Mar. 12, 2009.
Displaying Twitter Status in My Blog >> Alpha Gecko, downloaded from http://antone.geckotribe.com/alpha-gecko/displayingtwitterstatus-in-my-blog/, Mar. 12, 2009.

* cited by examiner

*Primary Examiner* — Rashawn Tillery
(74) *Attorney, Agent, or Firm* — Perry + Currier, Inc.

(57) ABSTRACT

A method, apparatus, and system for integrating presence data with contact data at a communication device is provided. A display device associated with the communication device is controlled via the processing unit to provide a representation of the contact data in at least one of an e-mail application and a PIM (Personal Information Manager) application. The display is controlled, via the processing unit, to provide a representation of the presence data in association with the representation of the contact data, the presence data associated with the contact data.

17 Claims, 9 Drawing Sheets

| | |
|---|---|
| Name: Chao Chen | 901a |
| E-mail: chao.chen@acmecorp.net | 901b |
| Phone Number: 416-555-1212 | 901c |
| Position: Manager-Sales | 901d |
| T (status)<br>-August 22, 11:13pm: New HP Movie Rocks<br>-August 21, 05:35pm: Stuck in Traffic<br>-August 20, 11:00am: Rain, and more rain go away<br>-August 18, 08:33pm: Dinner with In-laws (groan) | 901e |
| F (status)<br>-August 22, 06:13pm: At New HP Movie<br>-August 21, 09:35pm: Meeting with Management<br>-August 20, 11:01am: This summr sux! Where's the sun?<br>-August 18, 04:05pm: Dreading Dinner | 901f |

METHOD AND APPARATUS FOR INTEGRATING SOCIAL NETWORKING STAUS UPDATES WITH CONTACT DATA AT A COMMUNICATION DEVICE

FIELD

The specification relates generally to communication devices, and specifically to a method and apparatus for integrating presence data with contact data at a communication device.

BACKGROUND

Upon receipt of an e-mail containing contact data such as an e-mail address and/or an associated identifier (e.g. a name), and/or upon processing of contact data in a PIM (Personal Information Management) application, communication devices are often caused to thereafter retrieve presence information from social networking sites. For example, upon receipt of an e-mail, determining a type of reply to provide can be challenging and can lead to negative situations if the presence of the sender is unknown. Hence, the communication device can be caused to log-in to a presence server, such as a social networking website, such that the presence of the sender can be determined. This results in inefficient use of computing resources as the communication device is then asked to simultaneously process an e-mail application (and/or an PIM application) while processing an internet browser to retrieve the presence data from the social networking website. This further leads to inefficient use of bandwidth as generally retrieval of presence data from the social networking website involves retrieving irrelevant extraneous data. In instances where the communication device is wireless, this can further lead to increased cost as wireless bandwidth is generally expensive. Further, some presence sites (e.g. Facebook™, MySpace™, Twitter™, etc.) can be blocked at a corporate work site, hence people cannot sign on to access their contact's presence info. A system and method of accessing presence info without actively signing onto the site is preferred.

BRIEF DESCRIPTIONS OF THE DRAWINGS

Embodiments are described with reference to the following Figures, in which.

Figure 8:
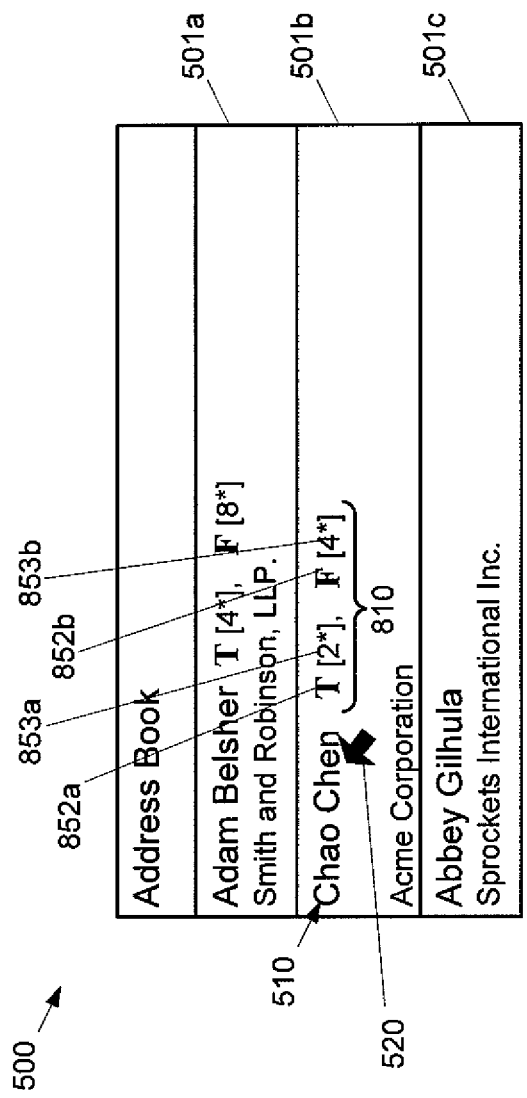

FIG. 8 depicts a representation of a PIM application, including a representation of presence data provided in association with a representation of contact data, according to non-limiting embodiments; and FIG. 9 depicts a representation of a PIM application, including a representation of presence data provided in association with a representation of contact data, according to non-limiting embodiments.

DETAILED DESCRIPTION OF THE EMBODIMENTS

A first aspect of the specification provides a method for integrating presence data with contact data at a communication device, the communication device comprising a processing unit interconnected with an input device, a display device, and a communication interface. The method comprises controlling, via the processing unit, the display device to provide a representation of the contact data in at least one of an e-mail application and a PIM (Personal Information Manager) application. The method further comprises controlling, via the processing unit, the display device to provide a representation of the presence data in association with the representation of the contact data, the presence data associated with the contact data.

Controlling the display device to provide the representation of the presence data in association with the representation of the contact data can occur in response to receiving, at the processing unit, an indication that a representation of the contact data provided at the display device has been selected via the input device.

The representation of the presence data can comprise a tooltip.

The method can further comprise requesting the presence data from the server. Requesting the presence data from the server can occur in response to receiving, at the processing unit, an indication that the representation of the contact data provided on the display device has been selected via the input device. Requesting the presence data from the server can occur in response to receiving, at the processing unit, the contact information in e-mail data received via the communication interface.

The method can further comprise receiving the presence data from the server.

The representation of the data can comprise at least one of: an identification of a presence service originating the presence data, at least one set of status update data associated with the presence data, a number of available sets of status update data, and an indication of whether the at least one set of status update data has been previously accessed.

The communication device can be enabled to communicate with a server and said presence data can received from said server via said communication interface.

A second aspect of the specification provides a method for managing presence data and contact data at a server enabled for communication with at least one communication device and a presence server, the server comprising a processing unit interconnected with a communication interface. The method comprises receiving a trigger, at the processing unit via the communication interface, to transmit the presence data to the at least one communication device, the presence data received from the presence server and associated with the contact data, the contact data associated with the at least one communication device. The method further comprises transmitting the presence data to the at least one communication device in association with the contact data, via the communication interface, such that a display device at the at least one communication device can be controlled to provide a representation of the presence data in association with a representation of the contact data in at least one of an e-mail application and a PIM (Personal Information Manager) application. Receiving the trigger can comprise at least one of: receiving an e-mail to be transmitted to the at least one communication device, the e-mail comprising the contact data; receiving a request for the presence data from the at least one communication device, the request identifying the contact data; and receiving the presence data from the presence server.

A third aspect of the specification provides a communication device for integrating presence data with contact data. The communication device provides a processing unit interconnected with an input device, a display device, and a communication interface. The processing unit is enabled to: control the display device to provide a representation of the contact data in at least one of an e-mail application and a PIM (Personal Information Manager) application; and control the display device to provide a representation of the presence data in association with the representation of the contact data, the presence data associated the contact data.

Control of the display device to provide the representation of the presence data in association with the representation of the contact data can occur in response to receiving, at the processing unit, an indication that a representation of the contact data provided on the display device has been selected via the input device.

The representation of the presence data can comprise a tooltip.

The processing unit can be further enabled to request the presence data from the server. The request of the presence data from the server can occur in response to receiving, at the processing unit, an indication that the representation of the contact data provided on the display device has been selected via the input device. The request of the presence data from the server can occur in response to receiving, at the processing unit, the contact information in e-mail data received via the communication interface.

The processing unit can be further enabled to receive the presence data from the server.

The representation of the data can comprise at least one of: an identification of a presence service originating the presence data, at least one set of status update data associated with the presence data, a number of available sets of status update data, and an indication of whether the at least one set of status update data has been previously accessed.

The communication device can be enabled to communicate with a server such that the presence data can be received from the server via the communication interface.

A third aspect of the specification provides a server for managing presence data and contact data. The server comprises a processing unit interconnected with a communication interface, the communication interface enabled for communication with at least one communication device and a presence server. The processing unit is enabled to receive a trigger, via the communication interface, to transmit the presence data to the at least one communication device, the presence data received from the presence server and associated with the contact data, the contact data associated with the at least one communication device. The processing unit is further enabled to transmit the presence data to the at least one communication device in association with the contact data, via the communication interface, such that a display device at the at least one communication device can be controlled to provide a representation of the presence data in association with a representation of the contact data in at least one of an e-mail application and a PIM (Personal Information Manager) application.

To receive the trigger, the processing unit can be enabled to at least one of: receive an e-mail to be transmitted to the at least one communication device, the e-mail comprising the contact data; receive a request for the presence data from the at least one communication device, the request identifying the contact data; and receive the presence data from the presence server.

A fourth aspect of the specification provides a system for managing presence data and contact data. The system comprises at least one communication device enabled to: control a display device to provide a representation of the contact data in at least one of an e-mail application and a PIM (Personal Information Manager) application; and control the display device to provide a representation of the presence data in association with the representation of the contact data, the presence data associated the contact data. The system further comprises a server enabled to: communicate with the at least one communication device and a presence server; receive a trigger to transmit the presence data to the at least one communication device, the presence data received from the presence server and associated with the contact data, the contact data associated with the at least one communication device; and transmit the presence data to the at least one communication device in association with the contact data.

A fifth aspect of the specification provides a computer program product, comprising a computer usable medium having a computer readable program code adapted to be executed to implement a method for integrating presence data with contact data at a communication device, the communication device comprising a processing unit interconnected with an input device, a display device, and a communication interface, the method comprising: controlling, via the processing unit, the display device to provide a representation of the contact data in at least one of an e-mail application and a PIM (Personal Information Manager) application; and controlling, via the processing unit, the display device to provide a representation of the presence data in association with the representation of the contact data, the presence data associated the contact data.

A fifth aspect of the specification provides a computer program product, comprising a computer usable medium having a computer readable program code adapted to be executed to implement a method for managing presence data and contact data at a server enabled for communication with at least one communication device and a presence server, the server comprising a processing unit interconnected with a communication interface, the method comprising: receiving a trigger, at the processing unit via the communication interface, to transmit the presence data to the at least one communication device, the presence data received from the presence server and associated with the contact data, the contact data associated with the at least one communication device; and transmitting the presence data to the at least one communication device in association with the contact data, via the communication interface, such that a display device at the at least one communication device can be controlled to provide a representation of the presence data in association with a representation of the contact data in at least one of an e-mail application and a PIM (Personal Information Manager) application.

Figure 1:
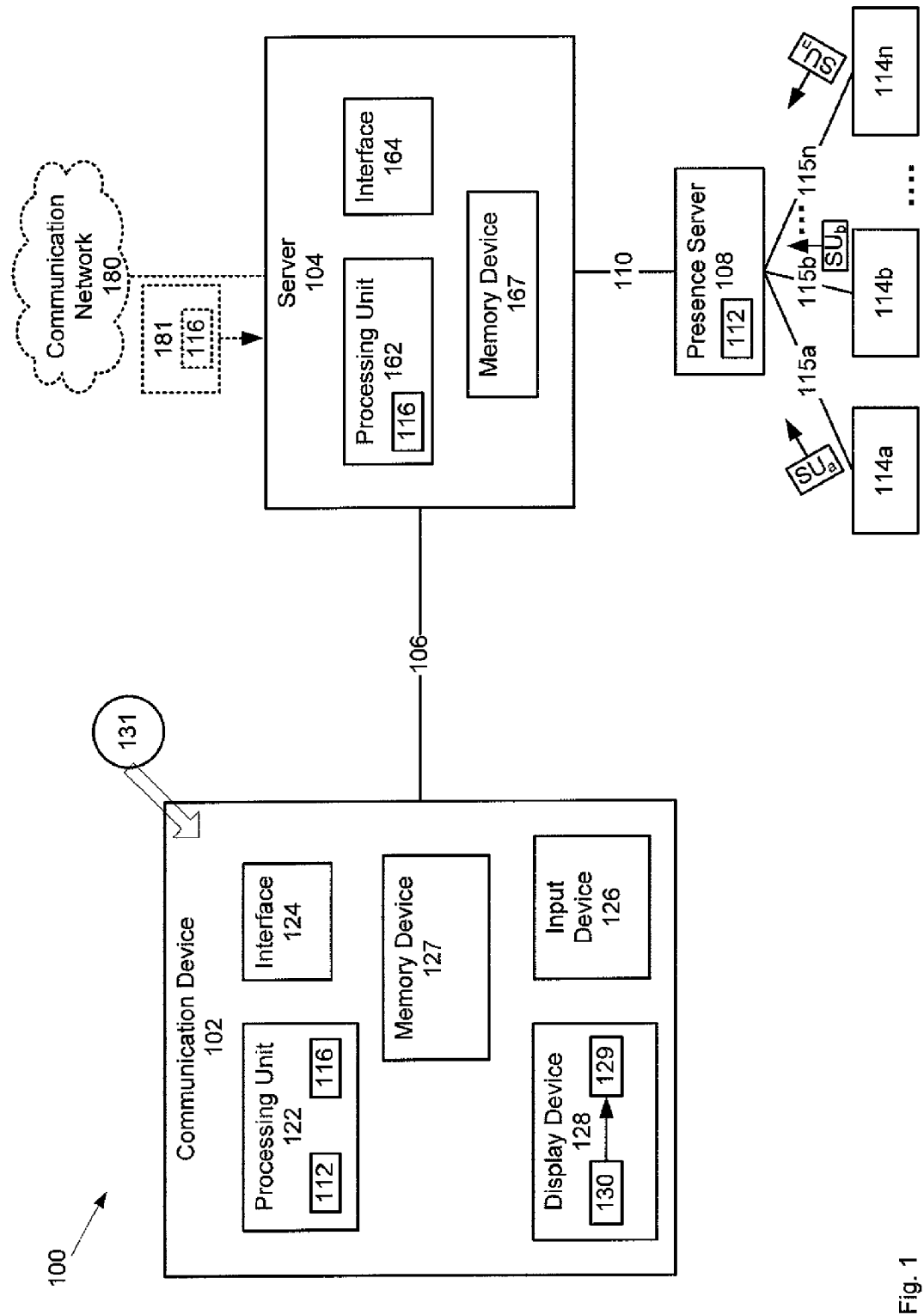
FIG. 1 depicts a system for integrating presence data with contact data at a communication device, according to non-limiting embodiments.

FIG. 1 depicts a system 100, including a communication device 102 enabled for communication with a server 104 via a link 106, server 104 enabled for communication with a presence server 108 via a link 110, according to non-limiting embodiments. Presence server 108 can be enabled to determine presence data 112. In some embodiments, presence server 108 can be enabled to determine presence data 112 by consolidating presence information received from at least one further presence server 114*a*, 114*b* . . . 114*n* (generically a presence server 114 and collectively presence servers 114)

into presence data 112, presence servers 114 in communication with presence server 108 via respective links 115a, 115b . . . 115n. It is understood that presence data 114 is generally associated with contact data 116, which is in turn is associated with communication device 102. As will be described below, server 104 is enabled to receive presence data 112 from presence server 108, and transmit presence data 112 to communication device 102, communication device 102 enabled to provide a representation of presence data 112 in association with a representation of contact data 114 in at least one of an e-mail application and a PIM (Personal Information Manager) application.

It is understood that each of links 106, 110, 115 can comprise any suitable combination of wired and wireless links desired, including but not limited to any suitable combination of wired and wireless communication networks. It is understood that links 106, 110, 115 can share resources, as desired, for example each of links 106, 110, 115 can share a common communication network including but not limited to the PSTN, an analog network, a packet based network, the Internet, a LAN, a WAN, a cellphone network, a wireless data network, a WiFi network, a WiMax network, Bluetooth, near field communications (NFC), and the like or a combination. Other suitable communication networks are within the scope of present embodiments.

Communication device 102 comprises a processing unit 122, a communication interface 124, a memory device 127, an input device 126 and a display device 128 all in communication, for example, via a computing bus (not depicted). Communication device 102 further comprises an application 131 that can be stored in memory device 127 and processed by processing unit 122. Application 131 generally comprises at least one of an e-mail application and a PIM application.

In general, communication device 102 comprises any suitable communication and/or computing device for processing application 131 including but not limited to any suitable combination of personal computers, laptops, mobile electronic devices, PDAs, cell phones and the like. Other suitable communication devices are within the scope of present embodiments.

Processing unit 122 comprises any suitable processing unit, including but not limited to a central processing unit (CPU) and any suitable combination of CPUs. Other suitable processing units are within the scope of present embodiments.

Communication interface 124 comprises any suitable communication interface enabled to communicate with server 104 via link 106. Accordingly, communication interface 124 is enabled to communicate via link 106 according to any suitable protocol which is compatible with link 106. Further, communication interface 124 is enabled to communicate in a wireless or wired manner, as desired, compatible with link 106, including but not limited to packet based protocols, Internet protocols, analog protocols, PSTN protocols, cell phone protocols (1X, UTMS, CDMA, GMS, and the like), WiFi protocols, WiMax protocols and the like, and/or a combination. Other suitable communication interfaces and/or protocols are within the scope of present embodiments.

Input device 126 is generally enabled to receive input data, and can comprise any suitable combination of input devices, including but not limited to a keyboard, a pointing device, a mouse, a track wheel, a touchpad, a touch screen and the like. Other suitable input devices are within the scope of present embodiments.

Memory device 127 can comprise any suitable memory device, including but not limited to any suitable combination of volatile memory and non-volatile memory, including but not limited to, random access memory (RAM), read-only memory (ROM), flash memory, magnetic computer storage devices (e.g. hard disks, floppy disks, and magnetic tape), optical discs, and the like. Other suitable memory devices are within the scope of present embodiments. Other suitable memory devices are within the scope of present embodiments. In particular, memory device 127 is enabled to store representation data for controlling display device 128 to display a representation 129 of data, for example a representation of contact data 116 and/or a representation of presence data 112.

Display device 128 comprises circuitry 130 for generating representation 129. Display device 128 can include any suitable combination of CRT and/or flat panel displays (e.g. LCD, plasma, AMOLED, capacitive or resistive touchscreens, and the like), and circuitry 130 can include any suitable combination of circuitry for controlling the CRT and/or flat panel displays etc., including but not limited to display buffers, transistors, electron beam controllers, LCD cells, plasmas cells, phosphors etc. In particular, display device 128 and circuitry 130 can be controlled by processing unit 122 to generate representation 129.

It is understood that, in some embodiments, at least one of input device 126 and display device 128 can be external to communication device 102, for example when communication device 102 comprises a personal computer connected to a monitor and a keyboard.

Server 104 comprises a processing unit 162, a communication interface 164, and a memory device 167, all in communication, for example, via a computing bus (not depicted). Each of processing unit 162, communication interface 164, and memory device 167 can be respectively similar to processing unit 122, communication interface 124, and memory device 167 described above. It is understood that communication interface 124 is further enabled to communicate with communication device 102 via link 106 and with presence server 108 via link 110 via any suitable combination of wired and wireless protocols, similar to communication interface 124. It is furthermore understood that, in some embodiments, server 104 can be in communication with any communication network 180 and message data intended for communication device 102, such as e-mail data 181, can be received from an originating communication device (not depicted) via communication network 180. It is further understood that, in these embodiments, communication network 180 comprises any suitable combination of wired and wireless networks and that communication interface 164 is further enabled to communicate with communication network 180 via any suitable combination of wired and wireless protocols.

It is further understood that, in some embodiments, server 102 can be in communication with a database (not depicted) for storing a copy of contact data 116.

Further, server 104 comprises any suitable server enabled to: manage contact data 116 associated with communication device 102; and convey presence data 112 from presence server 110 to communication device 102. Server 104 can comprise at least one of an e-mail server and a PIM server.

In some embodiments, as described above, server 104 can be enabled to receive e-mail data 181 intended for communication device 102, and convey e-mail data 181 to communication device 102. In some embodiments, server 104 stores e-mail data 181 at memory device 167 upon receipt until e-mail data 181 is conveyed to communication device 102. In other embodiments, server 104 can store a copy of e-mail data 181 at memory device 167 (and/or a remote database) until otherwise instructed to delete the copy. E-mail data 181 can be transmitted to communication device 102 by at least one of: receiving a request for messages from communication device 102; determining that communication device 102 is ready to receive e-mail data 181; and a synchronization process. In general it is understood that e-mail data 181 can comprise contact data 116, which in these embodiments can comprise at least one of an e-mail address and/or an IP address and/or network address associated with the originating communication device, and/or a name of a contact associated with the originating communication device.

In other embodiments, server 104 can be enabled to manage PIM data associated with communication device 102, including contact data 116. For example, in these embodiments, contact data 116 can comprise contact information, including but not limited to a name, geographic address, e-mail address, telephone number(s), company name, and the like, of a contact. Server 104 can store a copy of contact data 116 at memory device 167 (and/or a remote database), while contact data 116 is stored at communication device 116. A copy of contact data 116 at server 104 (and/or a remote database) can be updated as desired in a synchronization process with communication device 102.

While not depicted, it is understood that presence server 108 comprises a processing unit, communication interface and memory device, similar to processing unit 162, communication interface 164 and memory device 167, and is enabled to communicate with server 104, via link 110, and in some embodiments, with presence servers 114 via respective links 115. It is further understood that presence server 108 can be enabled to determine presence data 112 by at least one of: receiving presence data 112 via a communication network (e.g. presence server 108 can comprise a web server, which can be logged into via networked computing devices (not depicted) and presence information received via the networked computing devices; and receiving presence information from presence servers 114 and consolidating presence information in presence data 112.

In the latter embodiments, each presence server 114 can comprise a web server which can be logged into via networked computing devices (not depicted) and presence information received via the networked computing devices. For example, each presence server 114 can comprise a presence service including but not limited to a social networking website, such as Facebook™, Twitter™ and the like, and presence information can comprise status update data $SU_a$, $SU_b$, ... $SU_n$ (generically and collectively status update data SU) and/or a set of status updated data SU, as will be described below. In these embodiments, presence server 108 can be enabled to download respective status update data SU from presence servers 114, for example when changes in status update data SU occur at presence servers 114, and/or periodically. Alternatively, each presence server 114 can be enabled to transmit status updated data SU to presence server 108, for example when changes in status update data SU occur at presence servers 114, and/or periodically. It is understood that presence server 108 can also comprise a social networking website. It is further understood, however, that presence server 108 can be enabled to determine other types of presence information, including but not limited to other presence server statuses, instant messaging data/statuses, MySpace statuses™, location data, activity data, free/busy data and the like.

It is understood that presence data 112 (and/or status update data SU) can include, but is not limited to, presence status (e.g. away, busy, on vacation), a social network status (e.g. "Stuck in Traffic", "At New HP Movie", for example see FIG. 9 described below) and/or a date, time, of when presence data 112 (and/or status update data SU) was sent and/or posted, and/or a GPS stamp.

It is further understood that communication device 102 is authorized to receive presence data 112 (and/or server 104 and/or presence server 108 is authorized to receive presence data 112 and/or status updates SU). For example, communication device 102 can be associated with an account on a respective presence server 114 authorized to receive status update data SU for a given contact and/or communication device 102 (and/or server 104 and/or presence server 108) can be provisioned with passwords and the like for authorizing receipt of status updated data SU.

Figure 2:
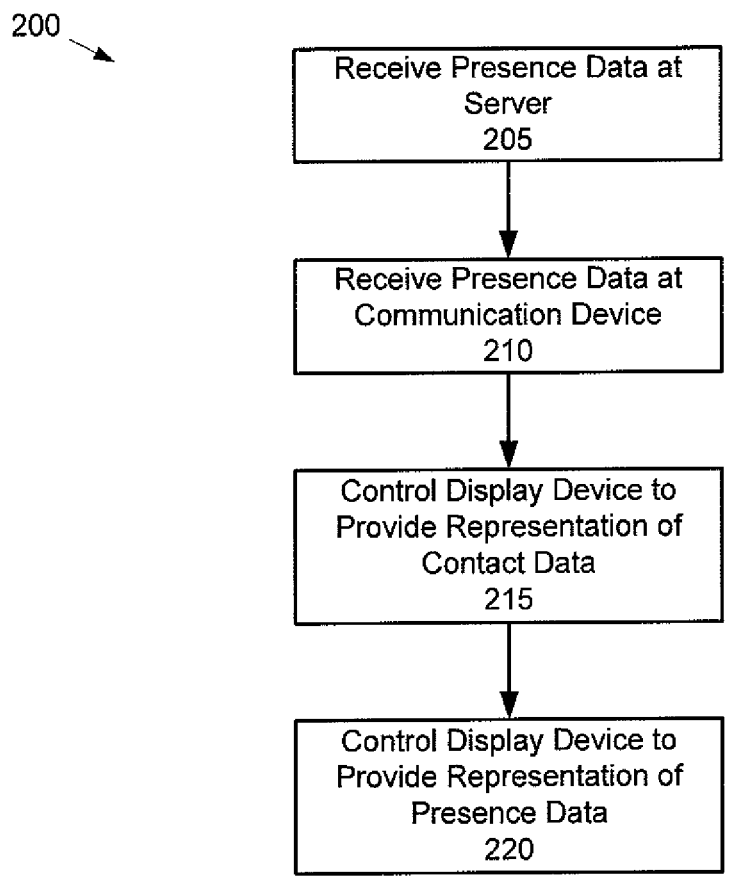
FIG. 2 depicts a method for integrating presence data with contact data at a communication device, according to non-limiting embodiments.

Attention is now directed to FIG. 2 which depicts a method 200 for integrating presence data with contact data at a communication device. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present embodiments.

Figure 3:
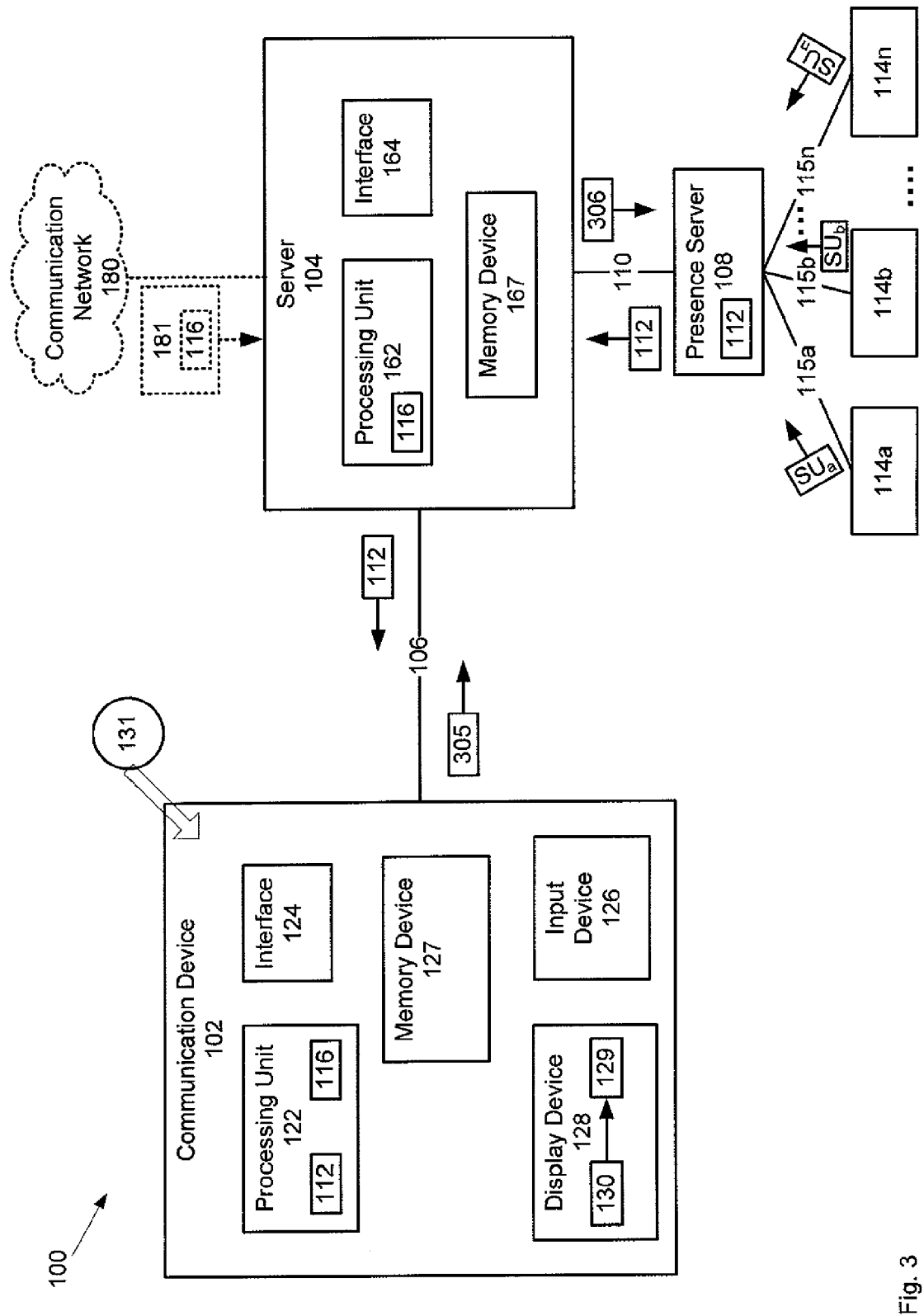
FIG. 3 depicts a system for integrating presence data with contact data at a communication device, according to non-limiting embodiments.

At step 205, presence data 112 is received at server 104 from presence server 108, while at step 210, presence data 112 is in turn received at communication device 102. Steps 205 and 210 will be described hereafter with reference to FIG. 3, similar to FIG. 1 with like elements having like numbers.

In some embodiments, communication device 102 requests presence data 112 from server 104 via a request 305 transmitted via link 106. Request 305 can include an identification of contact data 116 such that presence data 112 associated with contact data 115 can be identified. For example request 305 can include at least a subset of contact data 116, for example at least one of name data identifying a contact, an e-mail address and/or an IP address and/or network address associated with an originating communication device from which an e-mail from a contact was received, and/or associated with a contact. Request 305 can also comprise data authorizing receipt of presence data 112 (e.g. passwords, an identifier of communication device 102, an identifier of a user associated with communication device 102, and the like).

In some embodiments, once server 104 receives request 305, server 104 in turn requests presence data 112 from presence server 108 via a request 306, which in turn can request status update data SU from presence servers 114. In some embodiments, server 104 can store at least a subset of contact data 116 and/or data authorizing receipt of presence data 112. In any event, each of request 306 and requests for status updated data SU can include an identification of contact data 116 and/or data authorizing receipt of presence data (and/or receipt of status updates SU), as described above, such that presence data 112 associated with contact data 116 can be identified and received. Once status update data SU is received at presence server 108, presence server 108 consolidates status updated data SU into presence data 112, which is subsequently transmitted to server 104 (step 205), and then to communication device 102 (step 210). Use of requests 305 and 306 is a "pull" process in which communication device 102 pulls/requests presence data 112 from server 104, which in turn pulls/requests presence data 112 from presence server 108.

In some embodiments, request 306 is transmitted by server 104 upon receipt of request 305, while in other embodiments request 306 can be transmitted periodically, and received presence data 112 stored at server 104 until requested by communication device 102.

In yet further embodiments, one or more of status update data SU and presence data 112 can be provided to a suitable device via a suitable push process. For example, one or more of presence servers 114 can transmit respective status update data SU to presence server 108, for example when new status update data is posted to a respective presence server 114 and/or periodically. In turn, presence server 108 can transmit presence data 112 to server 104 when presence data 112 changes and/or is updated and/or periodically. Similarly, server 104 can transmit presence data 112 to communication device 102 when presence data 112 changes and/or is updated and/or periodically. Any suitable combination of pushing and pulling presence data 112 is within the scope of present embodiments.

Figure 4:
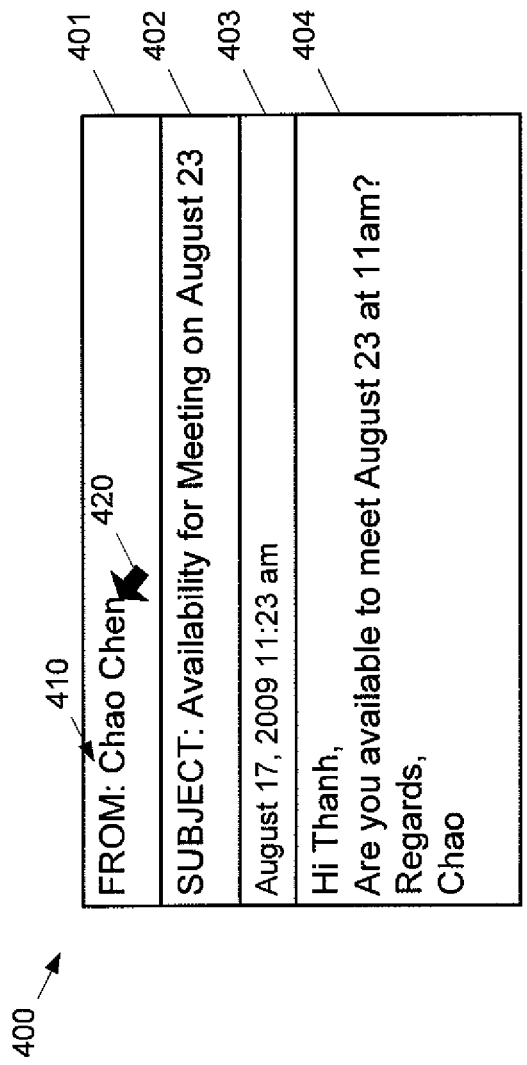
FIG. 4 depicts a representation of an e-mail application, according to non-limiting embodiments.
Figure 5:
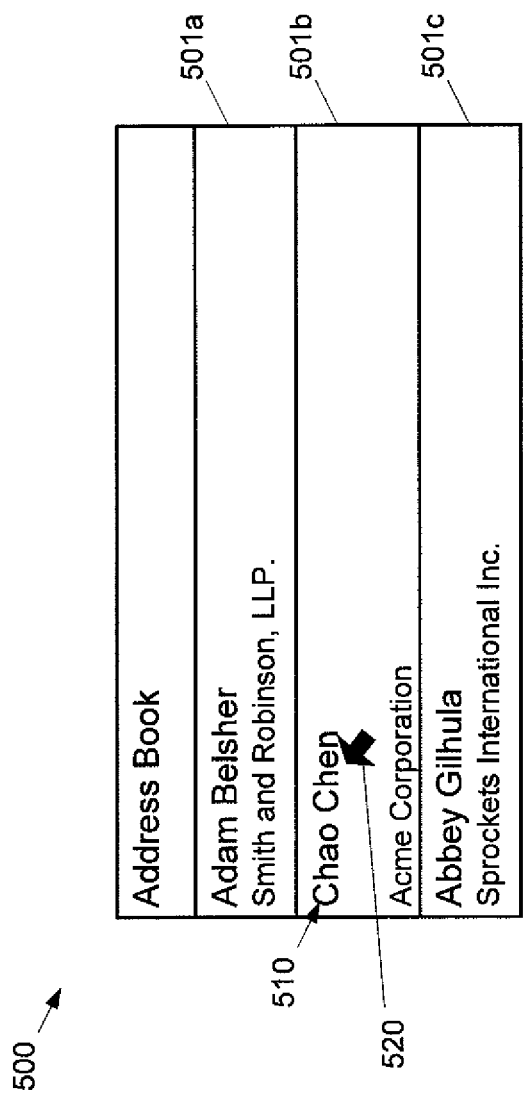
FIG. 5 depicts a representation of an PIM application, according to non-limiting embodiments.

Returning to request 305, and with reference to FIGS. 4 and 5, in some embodiments, transmitting request 305 occurs when an indication that a representation of contact data provided at display device 128 has been selected via input device 126. For example, FIG. 4 depicts a representation 400 of an e-mail application (e.g. application 131), which includes a field 401 for providing contact information (e.g. from who or from where an e-mail is from), a field 402 providing a subject, a field 403 for providing a date/time etc. that an e-mail was received, and a field 404 for providing text of an e-mail. In particular, field 401 comprises a representation 410 of contact data 116 ("Chao Chen") from who the e-mail has been received. In some embodiments, representation 129 comprises representation 400. In depicted embodiments, representation 410 of contact data 116 comprises name data including the name of a contact from whom the e-mail was received, however in other embodiments, representation 410 of contact data 116 can include but is not limited to an e-mail address and/or an IP address and/or network address associated with an originating communication device from which the e-mail was received. In any event, representation 410 can be selected via receipt of an indication from input device 126, for example receipt of data that a cursor 420 has been moved into the vicinity of and/or on top of representation 410 and/or that representation 410 has been "clicked" on via input device 126 (e.g. when input device 126 comprises a pointing device).

Furthermore, it is understood that representation 400 comprises at least a portion of e-mail data 181, and further that requesting presence data 112 from server 104 (e.g. via request 305) can occur in response to receiving, at processing unit 122, contact data 116 within e-mail data 181. In yet further embodiments, server 104 can request presence data 112 associated with contact data 116 received in e-mail data 181 when e-mail data 181 is received at server 104; e-mail data 181 and presence data 112 is subsequently transmitted to communication device 102 when presence data 112 is received at server 104.

Similarly, FIG. 5 depicts a representation 500 of a PIM application (e.g. application 131), specifically an address book, which includes fields 501a, 501b, 501c (generically a field 501 and collectively fields 501), each for providing contact information for a respective contact. While representation 500 comprises three fields 501, representation 500 can comprise any suitable number of fields 501. Furthermore, it is understood that the number of fields 501 provided in representation 500 need not represent a total number of contacts stored in the address book, but that representation 500 provides a subset of the total number of contacts stored in the address book (e.g. based on a size of display device 128 and/or a results of search data and/or a configurable number, and the like). In some embodiments, representation 129 comprises representation 500.

In any event, each field 501 comprises a representation of respective contact data. In exemplary embodiments, field 501b comprises a representation 510 of contact data 116, representation 510 comprising name data ("Chao Chen") including the name of a contact. While only one representative representation 510 is indicated FIG. 5 for clarity, it is understood that, as depicted, each field 501 comprises a similar representation of contact data. In other embodiments, representation 510 can include but is not limited to an e-mail address and/or an IP address and/or network address associated with a communication device associated with a contact. In any event, representation 510 can be selected via receipt of an indication from input device 126, for example receipt of data that a cursor 520 has been moved into the vicinity of and/or on top of representation 510 and/or that representation 510 has been "clicked" on via input device 126 (e.g. when input device 126 comprises a pointing device).

In any event, at step 215 processing unit 122 controls display device 128 to provide a representation of contact data 116 in at least one of an e-mail application and a PIM (Personal Information Manager) application, for example representation 400 and representation 500, specifically representations 410 and 510 respectively. In some embodiments, a representation of contact data 116 can be provided in an application that combines an e-mail application and a PIM application.

Figure 6:
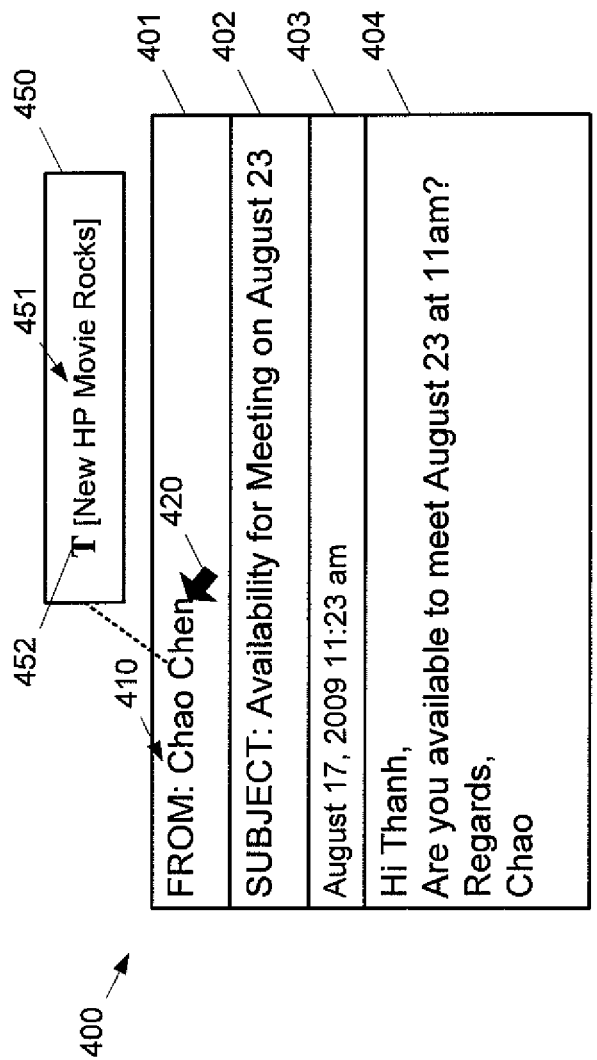
FIGS. 6 and 7 depict a representation of an e-mail application, including a representation of presence data provided in association with a representation of contact data, according to non-limiting embodiments.

At step 220, processing unit 122 controls display device 128 to provide a representation of presence data 112 in association with the representation of contact data 116. For example, a representation of presence data 112 can be provided adjacent a representation of contact data 116. As described above, it is understood that presence data 112 is associated with contact data 116. For example, as depicted in FIG. 6, substantially similar to FIG. 4 with like elements having like numbers, within representation 400, a representation 450 of presence data 112 can be provided in association with representation 410, for example adjacent representation 410, representation 450 comprising text data 451 received in presence data 112, text data 451 comprising of status data SU associated with a respective presence server 114. For example, presence server 114a can comprise a Twitter™ server, and hence text data 451 "New HP Movie Rocks" can be representative of a Twitter™ status received in presence data 112. Furthermore, in some embodiments, representation 450 can further comprise an identifier 452 of presence server 114a which originated the respective text data 451; in depicted exemplary embodiments, identifier 452 comprises an icon, "T" representative of Twitter™ server 114a.

It is further understood that in some embodiments, as depicted, representation 450 can comprise a tooltip.

It is furthermore understood that representation 450 can be provided when data from input device 126 is indicative that representation 410 has been selected by scrolling over representation 410.

It is yet further understood that steps 215 and 220 can be performed in any suitable order and/or concurrently.

Figure 7:
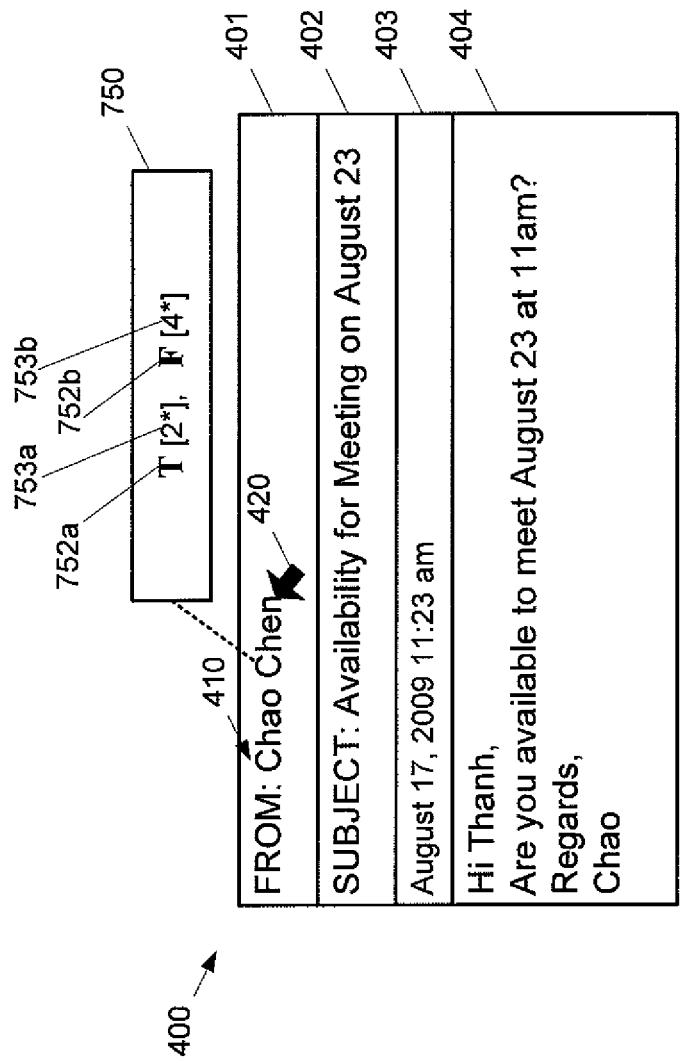

In alternative embodiments depicted in FIG. 7, substantially similar to FIG. 4 with like elements having like numbers, a representation 750 of presence data 112 can be provided in association with representation 410, for example adjacent to representation 410, representation 750 comprising at least one identifier 752a, 752b of at least one presence server 114, and respective indications 753a, 753b of a number of available sets of status update data SU, and alternatively an indication (e.g. the symbol "*") of whether at least one respective set of status update data SU has been previously accessed. For example, presence server 114a can comprise a Twitter™ server, and presence server 114b can comprise a Facebook™ server; hence identifiers 752a, 752b respectively comprise icon, "T" representative of a Twitter™ server and an icon "F", representative of a Facebook™ server. Furthermore, respective indications 753a, 753b indicate that two ("2") status updates SU are available from Twitter™ and four ("4") status updates are available from Facebook™, while the symbol "*" adjacent each of "2" and "4" is indicative that each respective set of status updates SU are "new", in other words not previously accessed by communication device 102 and/or via respective presences services associated with communication device 102 and/or presences services associated with user of communication device 102 (such as respective Twitter™ or Facebook™ accounts, and/or request 350 and/or presence data 112 previously received to communication device 112 in step 210).

It is further understood that in some embodiments, as depicted, representation 750 can comprise a tooltip.

Furthermore, it is understood that in some embodiments, a representation of presence data 112, similar to at least one of representation 450 and representation 750, can be provided in association with representation 510 in FIG. 5.

Attention is now directed to FIG. 8, which is substantially similar to FIG. 5 with like elements having like numbers. In these embodiments, a representation of presence data 112 can be provided in association with each representation of contact data 116. For example, in FIG. 8, representation 810 is provided in association with representation 510, representation 810 comprising at least one identifier 852a, 852b of at least one presence server 114, and respective indications 853a, 853b of a number of available sets of status update data SU, and alternatively an indication (e.g. the symbol "*") of whether at least one respective set of status update data SU has been previously accessed. In general, representation 810 is similar to representation 750 described above. Furthermore, while only one representative representation 810 is indicated FIG. 8 for clarity, it is understood that, as depicted, each representation of contact data (similar to representation 510) can comprise a representation of presence data similar to representation 810.

In any event, in some embodiments, step 220 (controlling display device 128 to provide representation 450, 750, 810 of presence data 112 in association with a representation 410, 510 of contact data 116 can occur in response to receiving, at processing unit 122, an indication that a representation 410, 510 of contact data 116 provided at display device 128 has been selected via input device 128. In other embodiments, representation 450, 750, 810 of presence data 112 is provided in association with representation 410, 510 of contact data 116 whenever representation 410, 510 of contact data 116 is provided at display device 128. For example, in FIG. 8, whenever display device 128 is controlled to provide representation 500 (i.e. the address book), then a respective of presence data 112 (such as representation 810) can be provided in association with respective representations of contact data 116 without a representation of contact data 116 being specifically selected (e.g. as in field 501a in FIG. 8). In these embodiments, presence data 112 is updated periodically either by periodically transmitting request 305 and/or by receiving presence data 112, presence data 112 being stored in memory device 127 until processed by processing unit 122 when display device 239 is controlled to provide representation 500 as depicted in FIG. 8.

In some embodiments, selection of a field 501, as depicted in either of FIGS. 5 and 8 causes processing unit 122 to control display device 128 to provide a representation 900 as depicted in FIG. 9 according to non-limiting embodiments (e.g. upon receipt of data from input device 126 indicative that a double click on field 501 has occurred). In exemplary embodiments, it is assumed that field 501b has been selected, and hence further data associated with field 501b is provided in representation 900. Representation 900 comprises: a field 901a comprising name data representative of a name of a contact; a field 901b comprising e-mail data representative of an e-mail address of a contact; a field 901c comprising phone number data representative of a phone number of a contact; a field 901d comprising text data representative of a position of a contact in a company; a field 901e comprising presence data (e.g. presence data 112) representative of at least a first set of status updated data SU of a contact from a first presence server 114 (e.g. a Twitter™ server); and a field 901f comprising presence data (e.g. presence data 112) representative of at least a second set of status updated data SU of a contact from a second presence server 114 (e.g. a Facebook™ server). Data in fields 901e and 901f can be received via presence data 112, as described above and updated accordingly when presence data 112 is received. Furthermore, each line in fields 901e, 901f, aside from a header line ("T (status)", and "F (status)" respectively) is representative of a different status update SU from each respective presence server 114. In addition, each status updates SU can be provided with an indication of whether it has been previously accessed or not, for example via different fonts, colours, highlighting and the like: in the depicted embodiments, status updates SU that have not been previously accessed are underlined, while those that have been previously accessed are not underlined. Each line representative of a status update SU can be deleted as desired, for example via receipt of input data from input device 126 indicative that a line is to be deleted (e.g. after it has been viewed).

In any event, by automatically providing presence data 116 in association with contact data 112, computing resources at communication device 102 are used more efficiently by obviating a need to access status external to application 131 (e.g. via an internet browser). Hence, bandwidth is used more efficiently as only presence data is received without extraneous data (e.g. various graphics and other data etc. often associated with social networking websites). Furthermore, in embodiments where communication device 102 is a wireless communication device, this also leads to lower cost due to lower bandwidth consumption.

Those skilled in the art will appreciate that in some embodiments, the functionality of communication device 102, server 104, and presence servers 108, 114 can be implemented using pre-programmed hardware or firmware elements (e.g., application specific integrated circuits (ASICs), electrically erasable programmable read-only memories (EEPROMs), etc.), or other related components. In other embodiments, the functionality of communication device 102, server 104, and presence servers 108, 114 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for integrating a plurality of social network status updates with contact data at a communication device, said communication device comprising a processing unit interconnected with an input device, a display device, and a communication interface, said method comprising:
   controlling, via said processing unit, said display device to provide a representation of said contact data in a field of an e-mail application; and
   in response to determining that said field has been selected, controlling, via said processing unit, said display device to provide a representation of an aggregation of said plurality of social network status updates in a tooltip associated with said representation of said contact data, said plurality of social network status updates associated with said contact data, wherein said plurality of social network status updates is received from one or more presence services originating said plurality of social network status updates via a server, and said representation of said plurality of social network status updates comprises an identification of said one or more presence services;
   wherein said identification of said one or more presence services comprises one or more of one or more textual indicators and one or more icons representative of said one or more presence services.

2. The method of claim 1, further comprising requesting said plurality of social network status updates from said server.

3. The method of claim 1, further comprising receiving said plurality of social network status updates from said server.

4. The method of claim 1, wherein said representation of said plurality of social network status updates further comprises at least one of: a number of available sets of said plurality of social network status updates, and an indication of whether one or more of said plurality of social network status updates has been previously accessed.

5. The method of claim 1, wherein said communication device is enabled to communicate with said server and said plurality of social network status updates is received from said server via said communication interface.

6. A method for managing a plurality of social network status updates and contact data at a server enabled for communication with at least one communication device and one or more presence servers, said server comprising a processing unit interconnected with a communication interface, said method comprising:
   receiving a trigger, at said processing unit via said communication interface, to transmit said plurality of social network status updates to said at least one communication device, said plurality of social network status updates received from said one or more presence servers and associated with said contact data, said contact data associated with said at least one communication device; and
   transmitting said plurality of social network status updates to said at least one communication device in association with said contact data, via said communication interface, wherein said plurality of social network status updates comprises an identification of said one or more presence services originating said plurality of social network status updates, such that a display device at said at least one communication device can be controlled to provide a representation of an aggregation of said plurality of social network status updates in a tooltip associated with a representation of said contact data in in a field of an e-mail application, in response to determining that said field has been selected, wherein said representation of said plurality of social network status updates comprises said identification of said one or more presence services;
   wherein said identification of said one or more presence services comprises one or more of one or more textual indicators and one or more icons representative of said one or more presence services.

7. The method of claim 6, wherein receiving said trigger comprises at least one of:
   receiving an e-mail to be transmitted to said at least one communication device, said e-mail comprising said contact data;
   receiving a request for said plurality of social network status updates from said at least one communication device, said request identifying said contact data; and
   receiving said plurality of social network status updates from said one or more presence servers.

8. A communication device for integrating a plurality of social network status updates with contact data, comprising:
   a processing unit interconnected with an input device, a display device, and a communication interface, said processing unit enabled to:
   control said display device to provide a representation of said contact data in a field of an e-mail application; and
   in response to determining that said field has been selected, control said display device to provide a representation of said plurality of social network status updates in association with said representation of an aggregation of said contact data, said plurality of social network status updates associated with said contact data, wherein said plurality of social network status updates is received from one or more presence services originating said plurality of social network status updates via a server, and said representation of said plurality of social network status updates comprises an identification of said one or more presence services;
   wherein said identification of said one or more presence services comprises one or more of one or more textual indicators and one or more icons representative of said one or more presence services.

9. The communication device of claim 8, wherein said processing unit is further enabled to request said plurality of social network status updates from said server.

10. The communication device of claim 8, wherein said processing unit is further enabled to receive said plurality of social network status updates from said server.

11. The communication device of claim 8, wherein said representation of said plurality of social network status updates comprises at least one of: a number of available sets of said plurality of social network status updates, and an indication of whether one or more of said plurality of social network status updates has been previously accessed.

12. The communication device of claim 8, wherein said communication device is enabled to communicate with said server such that said plurality of social network status updates is received from said server via said communication interface.

13. A server for managing a plurality of social network status updates and contact data, comprising:
a processing unit interconnected with a communication interface, said communication interface enabled for communication with at least one communication device and one or more presence servers, said processing unit enabled to:
receive a trigger, via said communication interface, to transmit said plurality of social network status updates to said at least one communication device, said plurality of social network status updates received from said one or more presence servers and associated with said contact data, said contact data associated with said at least one communication device; and
transmit said plurality of social network status updates to said at least one communication device in association with said contact data, via said communication interface, wherein said plurality of social network status updates comprises an identification of said one or more presence services originating said plurality of social network status updates, such that a display device at said at least one communication device can be controlled to provide a representation of an aggregation of said plurality of social network status updates in a tooltip associated with a representation of said contact data in a field of an e-mail application in response to determining that said field has been selected, wherein said representation of said plurality of social network status updates comprises said identification of said one or more presence services;
wherein said identification of said one or more presence services comprises one or more of one or more textual indicators and one or more icons representative of said one or more presence services.

14. The server of claim 13, wherein to receive said trigger, said processing unit is enabled to at least one of:
receive an e-mail to be transmitted to said at least one communication device, said e-mail comprising said contact data;
receive a request for said plurality of social network status updates from said at least one communication device, said request identifying said contact data; and
receive said plurality of social network status updates from said one or more presence servers.

15. A system for managing plurality of social network status updates and contact data comprising:
at least one communication device enabled to:
control a display device to provide a representation of said contact data in a field of an e-mail application; and
in response to determining that said field has been selected, control said display device to provide a representation of said plurality of social network status updates in association with said representation of an aggregation of said contact data, said plurality of social network status updates associated with said contact data, wherein said representation of said plurality of social network status updates comprises an identification of one or more presence services originating said plurality of social network status updates via one or more presence servers, said identification of said one or more presence services comprising one or more of one or more textual indicators and one or more icons representative of said one or more presence services; and a server enabled to:
communicate with said at least one communication device and said one or more presence servers;
receive a trigger to transmit said plurality of social network status updates to said at least one communication device, said plurality of social network status updates received from said one or more presence servers and associated with said contact data, said contact data associated with said at least one communication device; and
transmit said plurality of social network status updates to said at least one communication device in association with said contact data.

16. A computer program product, comprising a computer usable medium having a non-transitory computer readable program code adapted to be executed to implement a method for integrating plurality of social network status updates with contact data at a communication device, said communication device comprising a processing unit interconnected with an input device, a display device, and a communication interface, said method comprising:
controlling, via said processing unit, said display device to provide a representation of said contact data in a field of an e-mail application; and
in response to determining that said field has been selected, controlling, via said processing unit, said display device to provide a representation of an aggregation of said plurality of social network status updates in a tooltip associated with said representation of said contact data, said plurality of social network status updates associated said contact data, wherein said plurality of social network status updates is received from one or more presence services originating said plurality of social network status updates via a server, and said representation of said plurality of social network status updates comprises an identification of said one or more presence services;
wherein said identification of said one or more presence services comprises one or more of one or more textual indicators and one or more icons representative of said one or more presence services.

17. A computer program product, comprising a computer usable medium having a non-transitory computer readable program code adapted to be executed to implement a method for managing plurality of social network status updates and contact data at a server enabled for communication with at least one communication device and a presence server, said server comprising a processing unit interconnected with a communication interface, said method comprising:
receiving a trigger, at said processing unit via said communication interface, to transmit said plurality of social network status updates to said at least one communication device, said plurality of social network status updates received from said one or more presence servers and associated with said contact data, said contact data associated with said at least one communication device; and
transmitting said plurality of social network status updates to said at least one communication device in association with said contact data, via said communication interface, wherein said plurality of social network status updates comprises an identification of said one or more presence services originating said plurality of social network status updates, such that a display device at said at least one communication device can be controlled to provide a representation of an aggregation of said plurality of social network status updates in a tooltip associated with a representation of said contact data in in a field of an e-mail application, in response to determining that said field has been selected, wherein said representation of said plurality of social network status updates comprises said identification of said one or more presence services;

wherein said identification of said one or more presence services comprises one or more of one or more textual indicators and one or more icons representative of said one or more presence services.

\* \* \* \* \*

UNITED STATES PATENT AND TRADEMARK OFFICE
CERTIFICATE OF CORRECTION

PATENT NO.         : 8,863,009 B2                                              Page 1 of 1
APPLICATION NO.    : 12/630927
DATED              : October 14, 2014
INVENTOR(S)        : Thanh Vinh Vuong It is certified that error appears in the above-identified patent and that said Letters Patent is hereby corrected as shown below:

On the Title page, item (54) and in the Specification, column 1, lines 1-4, in the Title, Please correct the title from: "METHOD AND APPARATUS FOR INTEGRATING SOCIAL NETWORK STAUS UPDATES WITH CONTACT DATA AT A COMMUNICATION DEVICE" to -- METHOD AND APPARATUS FOR INTEGRATING PLURALITY OF SOCIAL NETWORK STATUS UPDATES WITH CONTACT DATA AT A COMMUNICATION DEVICE --.

Signed and Sealed this
First Day of December, 2015

Michelle K. Lee
*Director of the United States Patent and Trademark Office*